UNITED STATES PATENT OFFICE.

EDWIN C. WEISGERBER, OF THE UNITED STATES ARMY.

COLORED SMOKE.

1,339,142. Specification of Letters Patent. Patented May 4, 1920.

No Drawing. Application filed January 10, 1919. Serial No. 270,571.

(FILED UNDER THE ACT OF MARCH 3, 1883, 22 STAT. L., 625.)

*To all whom it may concern:*

Be it known that I, EDWIN C. WEISGERBER, captain, Corps of Eng., U. S. A., a citizen of the United States, stationed at Washington, D. C., have invented an Improvement in Colored Smoke, of which the following is a specification.

The invention described herein may be used by the Government, or any of its officers or employees in prosecution of work for the Government, or by any other person in the United States, without payment of any royalty thereon.

The invention relates to colored smoke, for military or other purposes, and has particular relation to smoke that is red.

The smoke producing composition is made up of the following ingredients, with substantially the proportions given.

30 parts potassium chlorate,
15 parts lactose,
40 parts ammonium iodid,
25 parts iodin.

Each of the ingredients is ground to powder separately, and bolted through ordinary bolting cloth. They are then well mixed by pouring from one receptacle to another, instead of stirring which might be dangerous, and the finished product will give a smoke of great volume and very dense. The proportions may be slightly varied to suit conditions, as more chlorate will cause the product to burn faster, and more iodin will cause the smoke to be denser.

What I claim as my invention is:

1. A colored smoke producing composition comprising potassium chlorate, lactose, ammonium iodid, and iodin.

2. A colored smoke producing composition comprising in substantially the proportions following:

Potassium chlorate _____ 30 parts.
Lactose _____ 15 parts.
Ammonium iodid _____ 40 parts.
Iodin _____ 25 parts.

EDWIN C. WEISGERBER.